Nov. 3, 1931.  H. E. MILLER  1,830,438
CABLE SUPPORT
Filed Oct. 29, 1930
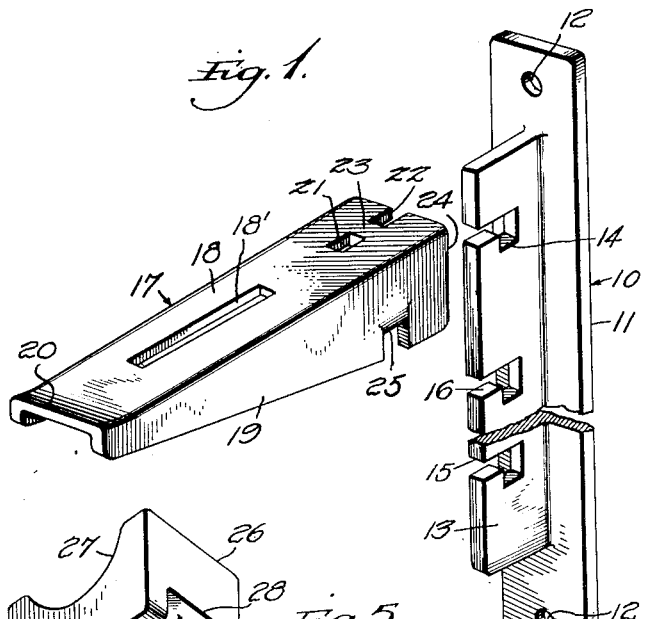
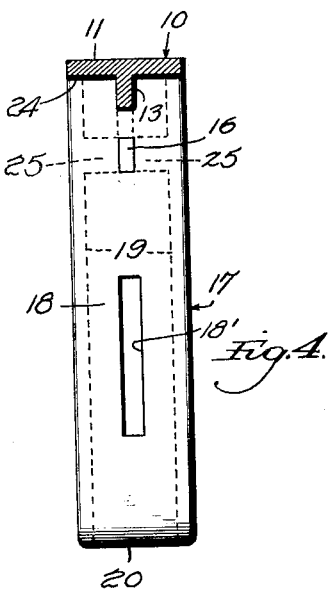
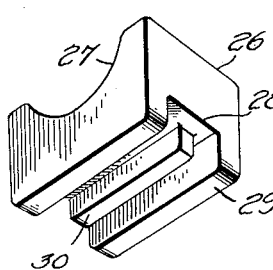
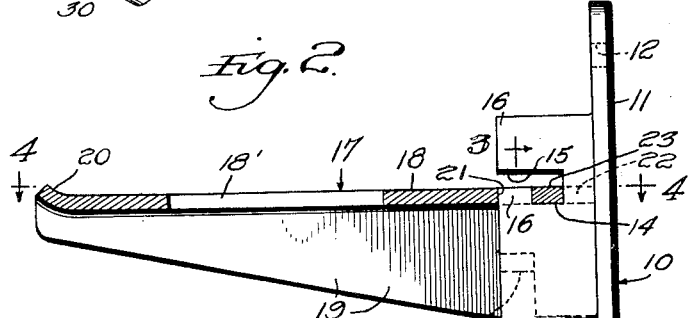
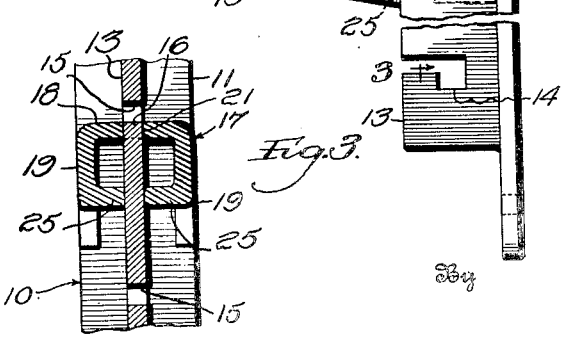
Inventor
H. E. MILLER Patented Nov. 3, 1931

1,830,438

UNITED STATES PATENT OFFICE

HERBERT E. MILLER, OF ALLENTOWN, PENNSYLVANIA

CABLE SUPPORT

Application filed October 29, 1930. Serial No. 492,033.

This invention relates to cable supports and more particularly to a cable rack adapted to be used for supporting cables in the manholes associated with underground conduit systems.

Cable supports are employed in manholes of the type referred to for supporting cables passing through conduits, and such devices usually embody a number of parts which are relatively complicated and expensive to manufacture. Furthermore, such constructions ordinarily must be replaced with supporting racks having a larger number of supporting arms associated therewith when it is desired to install additional cables.

It has been proposed to employ brackets of the character referred to having separable supporting arms associated with hangers therefor, but such constructions usually are rather difficult to assemble, and in use, the separable arms are apt to become disengaged from the supporting bracket.

An important object of the present invention is to provide a cable support which is extremely simple in construction and cheap to manufacture, and wherein a minimum number of parts is required.

A further object is to provide a device of the above mentioned character wherein a supporting bracket of integral construction is employed, and which is adapted to support one cable supporting arm or a plurality of such arms.

A further object is to provide such a device wherein the supporting arms employed are formed of a single piece of material and wherein each arm is provided with portions so co-related with respect to the bracket as to provide efficient means for anchoring the arm against movement.

A further object is to provide a novel supporting bracket and cable supporting arm therefor, wherein any tendency of the free end of the arm to swing upwardly will not permit the arm to become disengaged from the supporting bracket.

Other objects and advantages of the invention will become apparent during the course of the following description.

In the drawings I have shown one embodiment of the invention. In this showing,

Figure 1 is a perspective view of the supporting bracket and one of the arms disassembled, Figure 2 is a side elevation of the parts assembled, a portion of the supporting arm being shown in section, Figure 3 is a detail section on line 3—3 of Figure 2, Figure 4 is a horizontal section on line 4—4 of Figure 2, and, Figure 5 is a detail perspective view of an insulator adapted for use with the cable support.

Referring to the drawings the numeral 10 designates a supporting bracket as a whole which is substantially T-shaped in cross section throughout the greater portion of its length. The bracket includes a base 11 provided in its ends with bolt receiving openings 12 whereby the bracket may be secured against one of the walls of a manhole.

The bracket further includes an outstanding web or flange 13 which preferably terminates inwardly of the extremities of the base 11, as shown in Figures 1 and 2. The web 13 is provided with a plurality of upwardly opening notches 14 which communicate with the inner ends of slots 15, as clearly shown. The web 13 between the notches 14 and the free edge of the web 13 extend upwardly as at 16 to form lips for a purpose to be described.

The bracket 10 may be of any suitable height and may be provided with any desired number of the notches 14 and lips 16 according to the maximum number of cable supports which it is desired to provide. One of the cable supports is illustrated in the drawings and is indicated as a whole by the numeral 17. This arm is preferably formed of stamped steel from a single piece of material and is substantially U-shaped in cross section as indicated in Figure 3.

Each supporting arm includes a top plate 18 and depending side flanges 19, the later of which taper to decrease in width toward the free end of the arm. The free extremity of the top plate 18 preferably turns upwardly to a slight extent as at 20. The top plate 18 is preferably provided with an elongated opening 18' for a purpose to be described. Centrally of its width and at a point spaced from the inner end thereof, the top plate 18 is provided with an opening 21 substantially corresponding in shape and size to and adapted to receive one of the upwardly extending lips 16. At its inner extremity, and in alinement with the opening 21, the top plate 18 is notched as at 22 to straddle the inner portion of the web 13 adjacent the base 11. Obviously, the top plate 18 is provided with a transverse connection 23 which substantially corresponds in shape and size to and is adapted to be arranged in one of the notches 14.

The arm 17 preferably is of the same width as the base 11, and the inner extremities 24 of the side flanges 19 are adapted to seat against the base 11 substantially throughout the height of the inner extremity of the arm 17. The side flanges 19 are provided with lips 25 stamped inwardly substantially at right angles thereto. The ends of these lips are spaced apart a distance corresponding to the thickness of the web 13 and are adapted to contact with opposite sides thereof, as shown in Figures 2 and 3.

In Figure 5 of the drawings an insulator has been illustrated, which is particularly adapted for use with the supporting device. The insulator comprises a main body 26 having an arcuate recess 27 in its top face to receive cables supported by the device. The insulator body has its lower face grooved as at 28 to form depending flanges 29. These flanges are spaced apart a distance substantially equal to the width of the top plate 18 so as to straddle this plate with the flanges 29 lying against the side flanges 19. A longitudinal rib 30 projects downwardly from the recess 18 for reception in the opening 18'. The rib 30 substantially fits within the opening 18' to prevent the insulator from sliding on the support. The rib 30 and flange 29 combine to prevent the insulator from rocking or otherwise becoming displaced with respect to the supporting arm.

The operation of the device is as follows:
As many of the arms 17 may be employed as desired, up to the number of the notches 14 and associated lips 16. When the arm is to be assembled, it will be arranged in a position with the innermost edge of the plate 18 in the horizontal plane of one of the slots 15, and centered with respect thereto, whereupon the arm may be moved horizontally toward the web 11. When the extremities 24 of the arm contact with the base 11, the arm may be dropped downwardly to operative position, with the connection 23 arranged in the corresponding notch 14. When the arm moves to operative position, the lip 16 obviously will enter the opening 21 of the arm. With the parts in such position, the inwardly stamped lips 25 will contact with the outer faces of the web 13.

The engagement of the inner extremities 24 of the side flanges 19 against the web 11 forms an efficient engagement between the arm and bracket to prevent downward movement of the free end of the bracket. Under normal operating conditions, the connection 23 will prevent outward movement of the top plate away from the base 11 by virtue of its engagement in one of the notches 14. The arm 17 is further prevented from swinging or rocking by virtue of the engagement of the lips 25 against opposite sides of the web 13. In other words, a number of points of contact is provided to prevent displacement of the arm in any direction except vertically, and the arm, when placed in operative position, will be held in such position by gravity.

The insulator 26 is placed in the position referred to with the rib 30 arranged in the opening 18', and the flanges 29 contacting with the flanges 19. The cables are placed over the support and rest in the recess 27, and the weight of the cables will effectually hold the arm 17 against vertical movement. It also will be apparent that the firm engagement of the parts is such as to prevent disengagement of the arm from the bracket if any force should be transmitted to the arm tending to swing the free end thereof upwardly.

It will be apparent that the invention is not limited to the specific relative size of the supporting arm illustrated. For example, when it is desired to support several cables on the same arm, an elongated arm may be employed and may be provided with two or more of the openings 18 in order to support a corresponding number of the insulators 26. The device is simple in construction, and may be readily and cheaply manufactured. The bracket may be made from standard T-rail stock, while each arm readily may be stamped from a single piece of steel. It will be apparent that no separate fastening elements are employed, and the arms may be readily connected to the bracket or disconnected therefrom when desired. A single stock bracket may be employed for each installation, thus eliminating the necessity of removing the bracket when it is desired to place additional supporting arms in position thereon. Obviously, the parts are preferably galvanized or otherwise covered with a surface coating of some character to resist rust and corrosion.

It is to be understood that the form of the invention herewith shown and described is to be taken as a preferred example of the same and that various changes in the shape, size and arrangement of parts may be resorted to without departing from the spirit of the invention or the scope of the subjoined claims.

I claim:

1. A device of the character described comprising a bracket substantially T-shaped in cross section and including vertical base and flange portions the latter of which is provided with an upwardly opening notch spaced from its free edge, and an arm having a portion corresponding in shape and size to and engageable in said notch and having portions arranged on opposite sides of said flange portion and engageable against said base, said arm being provided with a pair of inwardly extending fingers contacting with opposite sides of said flange adjacent its free edge.

2. A device of the character described comprising a bracket substantially T-shaped in cross section and including vertical base and flange portions the latter of which is provided with an upwardly opening notch, said flange portion being further provided with an upwardly extending finger between said notch and the free edge of said flange portion, and an arm having an opening corresponding in shape and size to and adapted to receive said finger, a portion of said arm defining one end of said opening and being engageable in said recess, said arm having inner vertical end portions seating against said base portion on opposite sides of said flange, and being further provided with a pair of inwardly extending fingers contacting with opposite sides of said flange portion.

3. A device of the character described comprising a bracket substantially T-shaped in cross section and including vertical base and flange portions the latter of which is provided with an upwardly opening notch, said flange portion being further provided with an upwardly extending finger between said notch and the free edge of said flange portion, and an integral stamped arm including a top plate having depending flanges at the edge portions thereof, said top plate having an opening corresponding in shape and size to and adapted to receive said finger, and having a transverse member corresponding in shape and size to and engageable in said notch, the end of said top plate adjacent said transverse member being recessed to receive the portion of the flange of said bracket adjacent the base thereof, the ends of said depending flanges adjacent the notched end of said top plate being engageable against the base portion of said bracket on opposite sides of the flange portion thereof.

4. A device constructed in accordance with claim 3 wherein the depending flanges of said arm are spaced apart a distance greater than the thickness of the flange portion of said bracket and are provided with inwardly extending fingers contacting with opposite sides of the flange portion of said bracket.

5. A device of the character described comprising a bracket substantially T-shaped in cross section and including vertical base and flange portions the latter of which is provided with an upwardly opening notch, and an integral arm of substantially inverted U-shape having a portion of its base interlocking with said notch, the flanges of said arm being spaced apart a distance substantially greater than the thickness of the flange portion of said bracket and having its extremity adjacent the bracket contacting at least at its bottom portion with the base thereof, the flanges of said arm being provided with inwardly extending fingers contacting with opposite sides of the flange portion of said bracket.

In testimony whereof I affix my signature.

HERBERT E. MILLER.